(12) United States Patent
Kurkowski et al.

(10) Patent No.: US 11,392,989 B2
(45) Date of Patent: Jul. 19, 2022

(54) METHODS AND SYSTEMS OF MANAGING TARGETED COMMUNICATION TO A PLURALITY OF USER DEVICES

(71) Applicants: Henry John Kurkowski, Indianapolis, IN (US); Jonathan Kirby Goble, Indianapolis, IN (US)

(72) Inventors: Henry John Kurkowski, Indianapolis, IN (US); Jonathan Kirby Goble, Indianapolis, IN (US)

( * ) Notice: Subject to any disclaimer, the term of this patent is extended or adjusted under 35 U.S.C. 154(b) by 69 days.

(21) Appl. No.: 16/354,530

(22) Filed: Mar. 15, 2019

(65) Prior Publication Data

US 2019/0295130 A1     Sep. 26, 2019

Related U.S. Application Data

(60) Provisional application No. 62/646,520, filed on Mar. 22, 2018.

(51) Int. Cl.
| *G06Q 30/00* | (2012.01) |
| *G06Q 30/02* | (2012.01) |
| *H04W 4/029* | (2018.01) |
| *H04W 12/63* | (2021.01) |
| *H04W 12/06* | (2021.01) |

(52) U.S. Cl.
CPC ..... *G06Q 30/0267* (2013.01); *G06Q 30/0261* (2013.01); *H04W 4/029* (2018.02); *H04W 12/63* (2021.01); *H04W 12/06* (2013.01)

(58) Field of Classification Search
None
See application file for complete search history.

(56) References Cited

U.S. PATENT DOCUMENTS

| 8,510,773 B1 * | 8/2013 | Abou-Rizk | ...... H04N 21/25841 |
| | | | 725/34 |
| 8,676,663 B1 * | 3/2014 | Robinson | ........... G06Q 30/0259 |
| | | | 705/14.1 |

(Continued)

OTHER PUBLICATIONS

Virulkar et al. published article "Location Based Mobile Advertisement Publishing System", 2015, IEEE, DOI 10.1109/ICCUBEA. 2015.200, pp. 570-574 (Year: 2015).*

(Continued)

*Primary Examiner* — Naresh Vig (57) ABSTRACT

Disclosed is a system for managing targeted communication to a plurality of user devices. The system may include a communication device configured for receiving interaction data from a network device associated with a location, receiving a network device identifier from the network device, transmitting a graphical user interface to an administrator device, receiving the communication policy from the administrator device associated with the location and transmitting the at least one targeted communication to the at least one user device. Further, the system may include a processing device configured for determining a location of the network device based on the network device identifier, analyzing the interaction data, determining the at least user data associated with the at least one user device based on the analyzing, and generating at least one targeted communication based on the at least one user data and the communication policy.

14 Claims, 8 Drawing Sheets

(56) References Cited

U.S. PATENT DOCUMENTS

| | | | | |
|---|---|---|---|---|
| 8,825,085 | B1* | 9/2014 | Boyle | H04L 67/303 |
| | | | | 455/457 |
| 2006/0026067 | A1* | 2/2006 | Nicholas | G06Q 30/00 |
| | | | | 705/14.58 |
| 2007/0264968 | A1* | 11/2007 | Frank | G06Q 30/02 |
| | | | | 455/404.2 |
| 2011/0016483 | A1* | 1/2011 | Opdycke | H04N 21/26258 |
| | | | | 725/14 |
| 2012/0078726 | A1* | 3/2012 | Black | G06Q 50/01 |
| | | | | 705/14.66 |
| 2013/0085869 | A1* | 4/2013 | Carlson | G06Q 30/0207 |
| | | | | 705/14.72 |
| 2019/0026777 | A1* | 1/2019 | Bloy | G06F 16/487 |
| 2019/0090174 | A1* | 3/2019 | Rocci | H04W 4/40 |
| 2019/0156349 | A1* | 5/2019 | Chan | G06Q 30/0267 |
| 2019/0253745 | A1* | 8/2019 | Sheehan | H04N 21/435 |

OTHER PUBLICATIONS

Jamaluddin et al. published article "Hotring Advertising Model for Broadband Hotspots", IEEE Communications Society, WCNC 2004, pp. 2064-2068 (Year: 2004).*

Haddadi et al. published article "MobiAd: Private and Scalable Mobile Advertising", Sep. 24, 2010, MobiArch, ACM 978-1-4503-0143-5/10/09, pp. 33-38 (Year: 2010).*

Yu et al. published article "Public Wi-Fi Monetization via Advertising", Aug. 2017, IEEE, IEEE/ACM Transactions on Networking, vol. 25, No. 4, pp. 2110-2121 (Year: 2017).*

Rick Dedrick, Interactive Electronic Advertising, 1994, Intel Corporation (Year: 1994).*

* cited by examiner

METHODS AND SYSTEMS OF MANAGING TARGETED COMMUNICATION TO A PLURALITY OF USER DEVICES

TECHNICAL FIELD

Generally, the present disclosure relates to the field of data processing. More specifically, the present disclosure relates to methods and systems of managing targeted communication to a plurality of user devices.

BACKGROUND

Public Wi-Fi has become a standard in many business models, especially with restaurants and coffee shops. Some use a more open Wi-Fi network that is not very secure. Others use a managed Wi-Fi network that requires a form of authentication by the end user. This authentication is used to help manage the Wi-Fi session.

The process of authentication allows for management of the Wi-Fi session that is being used by the end user. Authentication sets up time limits, forces the acceptance of terms of services agreement as well as many other options. It is common that some of these authentication practices capture information that the end user gives in exchange for the Wi-Fi session. This information can be useful for business to get customers back sooner in a targeted and efficient way.

Therefore, there is a need for improved methods and systems of managing targeted communication to a plurality of user devices that may overcome one or more of the above-mentioned problems and/or limitations.

BRIEF SUMMARY

This summary is provided to introduce a selection of concepts in a simplified form, that are further described below in the Detailed Description. This summary is not intended to identify key features or essential features of the claimed subject matter. Nor is this summary intended to be used to limit the claimed subject matter's scope.

Disclosed herein is a method of managing targeted communication to a plurality of user devices. The method may include receiving, using a communication device, interaction data from a network device associated with a location. Further, the network device may be configured for communicating with at least one user device over a wireless communication channel. Further, the interaction data may be generated based on the communicating. Further, the method may include receiving, using the communication device, a network device identifier from the network device. Further, the method may include transmitting, using the communication device, a graphical user interface to an administrator device. Further, the graphical user interface may be configured for presenting at least one user data associated with the at least one user device and receiving a communication policy. Further, the method may include receiving, using the communication device, the communication policy from the administrator device associated with the location. Further, the communication policy may be based on the location. Further, the method may include determining, using a processing device, a location of the network device based on the network device identifier. Further, the method may include analyzing, using the processing device, the interaction data. Further, the method may include determining, using the processing device, the at least user data associated with the at least one user device based on the analyzing. Further, the at least one user data may include at least one contact data. Further, the method may include generating, using the processing device, at least one targeted communication based on the at least one user data and the communication policy. Further, the method may include transmitting, using the communication device, the at least one targeted communication to the at least one user device. Further, the method may include storing, using a storage device, the location in association with the network device identifier. Further, the method may include storing, using the storage device, the interaction data. Further, the method may include storing, using the storage device, the at least one user data in association with the interaction data. Further, the method may include storing, using the storage device, the communication policy.

Further disclosed herein is a system for managing targeted communication to a plurality of user devices is disclosed. The system may include a communication device configured for receiving interaction data from a network device associated with a location. Further, the network device may be configured for communicating with at least one user device over a wireless communication channel. Further, the interaction data may be generated based on the communicating. Further, the communication device may be configured for receiving a network device identifier from the network device. Further, the communication device may be configured for transmitting a graphical user interface to an administrator device. Further, the graphical user interface may be configured for presenting at least one user data associated with the at least one user device and receiving a communication policy. Further, the communication device may be configured for receiving the communication policy from the administrator device associated with the location. Further, the communication policy may be based on the location. Further, the communication device may be configured for transmitting the at least one targeted communication to the at least one user device. Further, the system may include a processing device configured for determining a location of the network device based on the network device identifier. Further, the processing device may be configured for analyzing the interaction data. Further, the processing device may be configured for determining the at least user data associated with the at least one user device based on the analyzing. Further, the at least one user data may include at least one contact data. Further, the processing device may be configured for generating at least one targeted communication based on the at least one user data and the communication policy. Further, the system may include a storage device configured for storing the location in association with the network device identifier. Further, the storage device may be configured for storing the interaction data. Further, the storage device may be configured for storing the at least one user data in association with the interaction data. Further, the storage device may be configured for storing the communication policy.

Both the foregoing summary and the following detailed description provide examples and are explanatory only. Accordingly, the foregoing summary and the following detailed description should not be considered to be restrictive. Further, features or variations may be provided in addition to those set forth herein. For example, embodiments may be directed to various feature combinations and sub-combinations described in the detailed description.

BRIEF DESCRIPTION OF DRAWINGS

The accompanying drawings, which are incorporated in and constitute a part of this disclosure, illustrate various embodiments of the present disclosure. The drawings contain representations of various trademarks and copyrights owned by the Applicants. In addition, the drawings may contain other marks owned by third parties and are being used for illustrative purposes only. All rights to various trademarks and copyrights represented herein, except those belonging to their respective owners, are vested in and the property of the applicants. The applicants retain and reserve all rights in their trademarks and copyrights included herein, and grant permission to reproduce the material only in connection with reproduction of the granted patent and for no other purpose.

Furthermore, the drawings may contain text or captions that may explain certain embodiments of the present disclosure. This text is included for illustrative, non-limiting, explanatory purposes of certain embodiments detailed in the present disclosure.

DETAILED DESCRIPTION

As a preliminary matter, it will readily be understood by one having ordinary skill in the relevant art that the present disclosure has broad utility and application. As should be understood, any embodiment may incorporate only one or a plurality of the above-disclosed aspects of the disclosure and may further incorporate only one or a plurality of the above-disclosed features. Furthermore, any embodiment discussed and identified as being "preferred" is considered to be part of a best mode contemplated for carrying out the embodiments of the present disclosure. Other embodiments also may be discussed for additional illustrative purposes in providing a full and enabling disclosure. Moreover, many embodiments, such as adaptations, variations, modifications, and equivalent arrangements, will be implicitly disclosed by the embodiments described herein and fall within the scope of the present disclosure.

Accordingly, while embodiments are described herein in detail in relation to one or more embodiments, it is to be understood that this disclosure is illustrative and exemplary of the present disclosure, and are made merely for the purposes of providing a full and enabling disclosure. The detailed disclosure herein of one or more embodiments is not intended, nor is to be construed, to limit the scope of patent protection afforded in any claim of a patent issuing here from, which scope is to be defined by the claims and the equivalents thereof. It is not intended that the scope of patent protection be defined by reading into any claim limitation found herein and/or issuing here from that does not explicitly appear in the claim itself.

Thus, for example, any sequence(s) and/or temporal order of steps of various processes or methods that are described herein are illustrative and not restrictive. Accordingly, it should be understood that, although steps of various processes or methods may be shown and described as being in a sequence or temporal order, the steps of any such processes or methods are not limited to being carried out in any particular sequence or order, absent an indication otherwise. Indeed, the steps in such processes or methods generally may be carried out in various different sequences and orders while still falling within the scope of the present disclosure. Accordingly, it is intended that the scope of patent protection is to be defined by the issued claim(s) rather than the description set forth herein.

Additionally, it is important to note that each term used herein refers to that which an ordinary artisan would understand such term to mean based on the contextual use of such term herein. To the extent that the meaning of a term used herein—as understood by the ordinary artisan based on the contextual use of such term—differs in any way from any particular dictionary definition of such term, it is intended that the meaning of the term as understood by the ordinary artisan should prevail.

Furthermore, it is important to note that, as used herein, "a" and "an" each generally denotes "at least one," but does not exclude a plurality unless the contextual use dictates otherwise. When used herein to join a list of items, "or" denotes "at least one of the items," but does not exclude a plurality of items of the list. Finally, when used herein to join a list of items, "and" denotes "all of the items of the list."

The following detailed description refers to the accompanying drawings. Wherever possible, the same reference numbers are used in the drawings and the following description to refer to the same or similar elements. While many embodiments of the disclosure may be described, modifications, adaptations, and other implementations are possible. For example, substitutions, additions, or modifications may be made to the elements illustrated in the drawings, and the methods described herein may be modified by substituting, reordering, or adding stages to the disclosed methods. Accordingly, the following detailed description does not limit the disclosure. Instead, the proper scope of the disclosure is defined by the claims found herein and/or issuing here from. The present disclosure contains headers. It should be understood that these headers are used as references and are not to be construed as limiting upon the subjected matter disclosed under the header.

The present disclosure includes many aspects and features. Moreover, while many aspects and features relate to, and are described in the context of targeting advertisements, embodiments of the present disclosure are not limited to use only in this context.

Overview

Using Wi-Fi networks as a vehicle for digital marketing may allow managed Wi-Fi providers to offer a brand loyalty and marketing service that cannot be duplicated by any other means. Since managed Wi-Fi providers can control the end user's Wi-Fi session on the network it is possible to connect the end user with digital information as well as collect information on the end user through the login process. By using this ability and combining this user data with location-based login data on the end user it is possible to send highly targeted digital information to the end users who have logged on to a Wi-Fi network at very specific physical locations.

When these data pools are sorted and combined with end-user login times and dates, then the automated system may be scheduled to send targeted messages and promotions to the end user via email to incentivize the end user to return to the physical location faster and with more frequency based on when previous logins at the same physical locations have occurred as well as other parameters. There is clear potential for the Wi-Fi sessions to be used to get customers coming back sooner and in a more targeted and efficient way.

According to some embodiments, a method for the automation of scheduled templates sent to email addresses collected through remotely managed Wireless Access Points utilizing web hosted authentication portals is disclosed. This method may allow administrators who manage the Wireless Access Points to send out, manage and automate email communications to end users who have authenticated on a Wi-Fi network at specific physical locations through the hosted authentication portals all encapsulated within a Wi-Fi management platform. The method allows for the scheduling of emails based on the end user Wi-Fi session data including but not limited to dates of authentication.

According to some embodiments, the disclosed methods and systems allow Wi-Fi management platforms to use the data that they are already collecting and use it as a marketing and communications method. Wi-Fi management systems remotely manage Wireless Access Points, and many times collect email addresses from the end user in exchange for complementary Wi-Fi access. When that happens, the time and date of the access is recorded by the authentication process and associated with the end user and their email address.

According to some embodiments, a system to bring added value to a restaurant or other type of businesses that caters to the public and offers complimentary Wi-Fi by utilizing that data captured during the authentication process is disclosed. The disclosed system may be added as a subsystem to existing Wi-Fi management platforms by interfacing with their authentication systems and databases. The system may then work with the Wi-Fi management platform and offer targeted and scheduled incentives and updates to be sent to the end users by email. The system offers a convenient and data-driven way to promote a business via email marketing, by targeting existing customers and their frequency of use on the Wi-Fi, all contained within a single Wi-Fi management platform.

Figure 1:
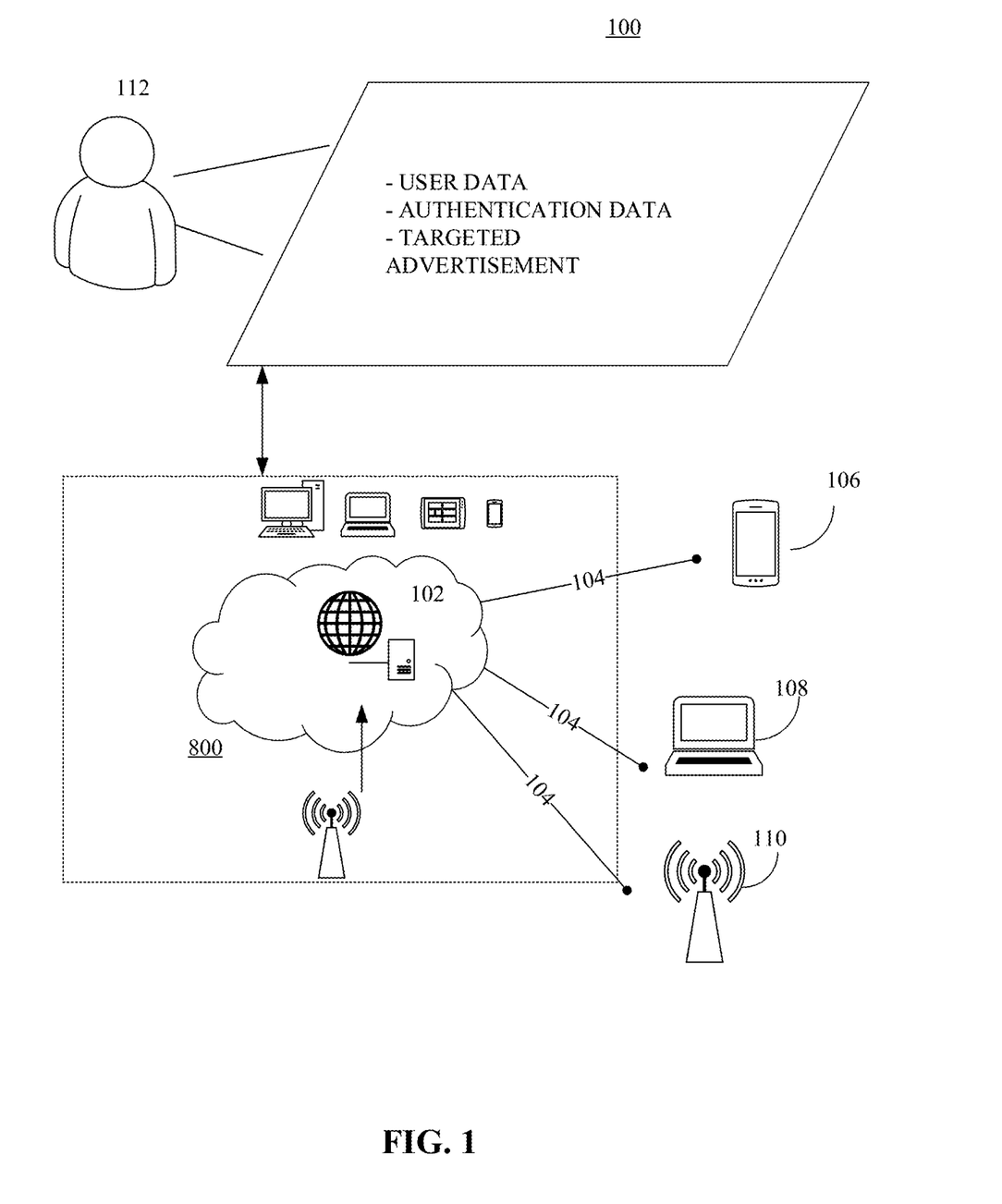
FIG. 1 is an illustration of an online platform consistent with various embodiments of the present disclosure.

FIG. 1 is an illustration of an online platform 100 consistent with various embodiments of the present disclosure. By way of non-limiting example, the online platform 100 for managing targeted communication to a plurality of user devices may be hosted on a centralized server 102, such as, for example, a cloud computing service. The centralized server 102 may communicate with other network entities, such as, for example, a mobile device 106 (such as a smartphone, a laptop, a tablet computer etc.), other electronic devices 108 (such as desktop computers, server computers etc.), network devices 110 (such as Wi-Fi routers), over a communication network 104, such as, but not limited to, the Internet. Further, users of the online platform 100 may include relevant parties such as, but not limited to, end users, administrators, service providers, service consumers and so on. Accordingly, in some instances, electronic devices operated by the one or more relevant parties may be in communication with the platform 100.

A user 112, such as the one or more relevant parties, may access online platform 100 through a web based software application or browser. The web based software application may be embodied as, for example, but not be limited to, a website, a web application, a desktop application, and a mobile application compatible with a computing device 800.

Figure 2:
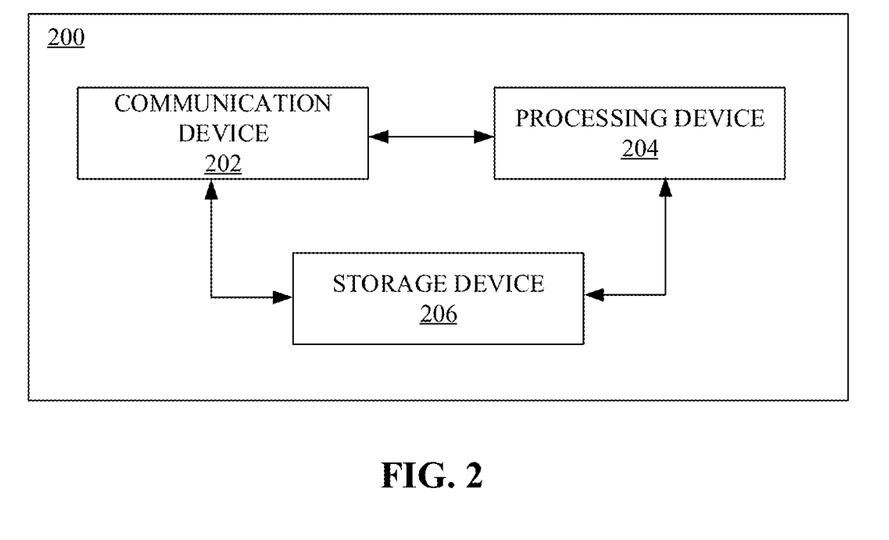
FIG. 2 is a block diagram of a system of managing targeted communication to a plurality of user devices, in accordance with some embodiments.

According to some embodiments, the online platform 100 may be configured to communicate with a system 200 for managing targeted communication to a plurality of user devices.

FIG. 2 is a block diagram of the system 200 of managing targeted communication to a plurality of user devices, in accordance with some embodiments. The system 200 may include a communication device 202 configured for receiving interaction data from a network device (such as a network device in the network devices 110) associated with a location. For example, the interaction data may include login-authentication process data. In some embodiments, the interaction data may include at least one user device identifier associated with the at least one user device. In some embodiments, the interaction data may include the at least one contact data.

Further, the network device may be configured for communicating with at least one user device over a wireless communication channel. For example, the network device may be a Wi-Fi router and the wireless communication channel may be a Wi-Fi communication channel. Further, the interaction data may be generated based on the communicating.

In some embodiments, the communication channel may include one or more of a near-field communication (NFC) channel, a Bluetooth communication channel, a Wi-Fi communication channel, a cellular communication channel and a satellite communication channel.

Further, the communication device 202 may be configured for receiving a network device identifier from the network device. Further, the communication device 202 may be configured for transmitting a graphical user interface to an administrator device. Further, the graphical user interface may be configured for presenting at least one user data associated with the at least one user device and receiving a communication policy. For example, this may enable an administrator to view the user data (e.g. name, email, phone number, etc.) and accordingly select (via the communication policy) who receives the targeted communications.

In some embodiments, the communication policy may include indication of a communication type corresponding to the at least one targeted communication, a communication medium corresponding to the at least one targeted communication, a communication schedule corresponding to the at least one targeted communication, a user selection criteria corresponding to the at least one targeted communication and a communication content indicator associated with the at least one targeted communication.

Further, the communication device 202 may be configured for receiving the communication policy from the administrator device associated with the location. Further, the communication policy may be based on the location. Further, the communication device 202 may be configured for transmitting the at least one targeted communication to the at least one user device. For example, the at least one targeted communication may include one or more electronic communication means such as an email, a Short Message Service (SMS), Instant Messaging (IM), social media messages etc.

Further, the system 200 may include a processing device 204 configured for determining a location of the network device based on the network device identifier. Thereafter, the locations of the user devices may be inferred based on the location of the network device (which is known a-priori during registration).

Further, the processing device 204 may be configured for analyzing the interaction data. Further, the processing device 204 may be configured for determining the at least user data associated with the at least one user device based on the analyzing. Further, the at least one user data may include at least one contact data. In some embodiments, a contact data of the at least one contact data associated with a user device of the at least one user device may include at least one of an email address, a name, a social security number, a driver's license number, a mobile phone number and an address.

Further, the processing device 204 may be configured for generating at least one targeted communication based on the at least one user data and the communication policy.

Further, the system 200 may include a storage device 206 configured for storing the location in association with the network device identifier. Further, the storage device 206 may be configured for storing the interaction data. Further, the storage device 206 may be configured for storing the at least one user data in association with the interaction data. Further, the storage device 206 may be configured for storing the communication policy.

In some embodiments, the network device may be configured for transmitting a prompt to the at least one user device over the wireless communication channel. Further, the network device may be configured for receiving the at least one user data from the at least one user device over the wireless communication channel. Further, the network device may be configured for providing at least one communication service to the at least one user device based on receiving the at least one user data over the wireless communication channel.

In some embodiments, the at least one communication service may include one or more of internet connectivity and digital content delivery.

In some embodiments, the communication device 202 may be further configured for receiving a time indicator associated with the interaction data. Further, the communication policy may include an indication of a communication schedule. Further, the transmitting of the at least one targeted communication may be based on each of the time indicator and the communication schedule.

In some embodiments, the communication policy may include the indication of a communication schedule including a time delay indicator and a number of communications indicator. Further, the at least one targeted communication may include a plurality of targeted communications corresponding to a plurality of batches. Further, the processing device 204 may be further configured for generating the plurality of batches according to the number of communications indicator. Further, the communication device 202 may be further configured for transmitting the plurality of targeted communications in batches. Further, a number of communications in each batch may be based on the number of communications indicator. Further, a time interval between transmitting of a first batch of the plurality of batches and a second batch of the plurality of batches may be based on the time delay indicator.

In some embodiments, the communication device 202 may be further configured for receiving a predesigned template from the administrator device. Further, the processing device 204 may be configured for generating the at least one targeted communication based further on the predesigned template.

Figure 3:
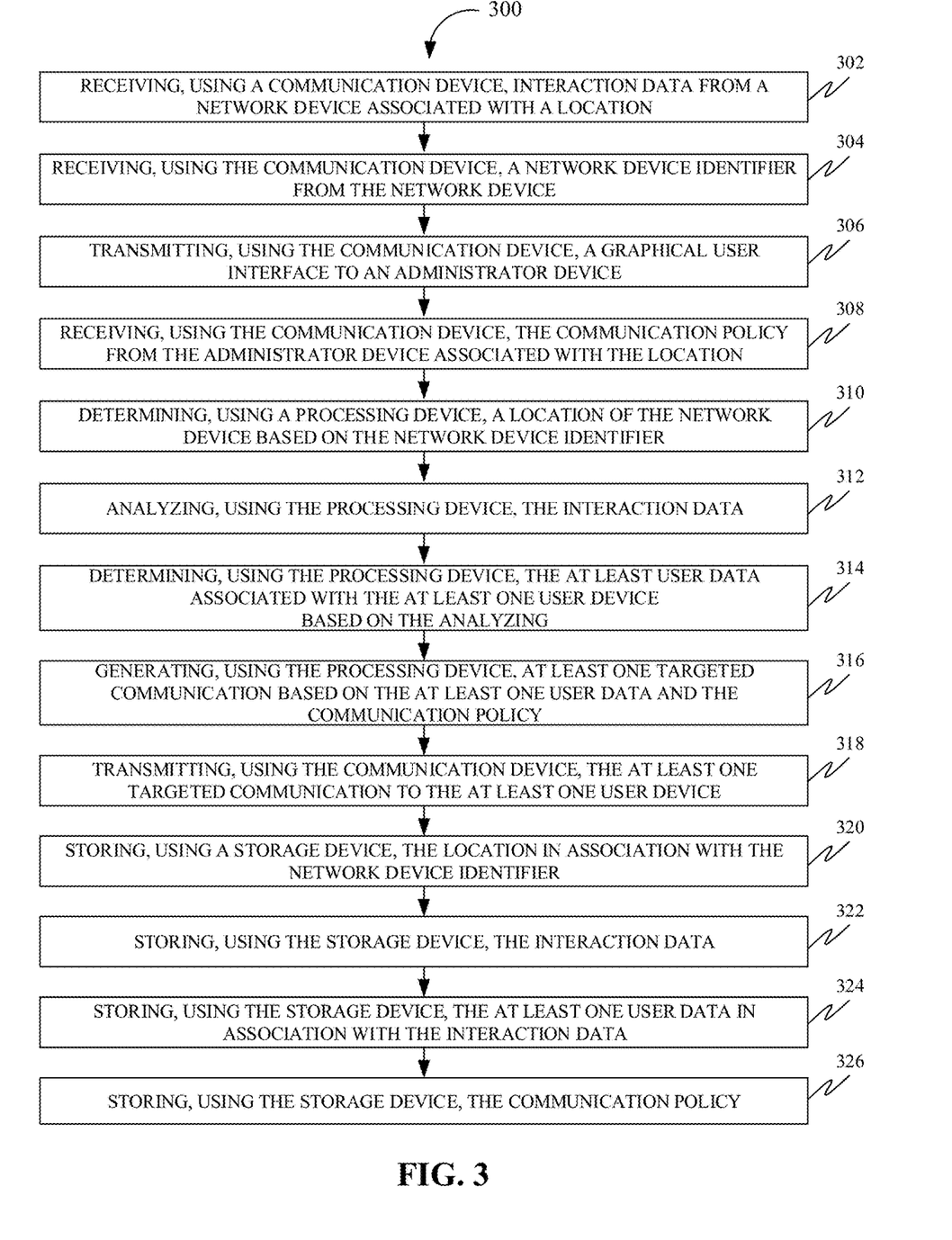
FIG. 3 is a flowchart of a method of managing targeted communication to a plurality of user devices, in accordance with some embodiment.

FIG. 3 is a flowchart of a method 300 of managing targeted communication to a plurality of user devices, in accordance with some embodiment. At 302, the method 300 may include receiving, using a communication device (such as the communication device 202), interaction data from a network device (such as a network device in the network devices 110) associated with a location. In some embodiments, the interaction data may include at least one user device identifier associated with the at least one user device. In some embodiments, the interaction data may include the at least one contact data.

Further, the network device may be configured for communicating with at least one user device over a wireless communication channel. Further, the interaction data may be generated based on the communicating. In some embodiments, the communication channel may include one or more of a near-field communication (NFC) channel, a Bluetooth communication channel, a Wi-Fi communication channel, a cellular communication channel and a satellite communication channel.

Further, at 304, the method 300 may include receiving, using the communication device, a network device identifier from the network device. Further, at 306, the method 300 may include transmitting, using the communication device, a graphical user interface to an administrator device. Further, the graphical user interface may be configured for presenting at least one user data associated with the at least one user device and receiving a communication policy.

In some embodiments, the communication policy may include indication of a communication type corresponding to the at least one targeted communication, a communication medium corresponding to the at least one targeted communication, a communication schedule corresponding to the at least one targeted communication, a user selection criteria corresponding to the at least one targeted communication and a communication content indicator associated with the at least one targeted communication.

Further, at 308, the method 300 may include receiving, using the communication device, the communication policy from the administrator device associated with the location. Further, the communication policy may be based on the location.

Further, at 310, the method 300 may include determining, using a processing device (such as the processing device 204), a location of the network device based on the network device identifier. At 312, the method 300 may include analyzing, using the processing device, the interaction data. At 314, the method 300 may include determining, using the processing device, the at least user data associated with the at least one user device based on the analyzing. Further, the at least one user data may include at least one contact data.

Further, at 316, the method 300 may include generating, using the processing device, at least one targeted communication based on the at least one user data and the communication policy. At 318, the method 300 may include transmitting, using the communication device, the at least one targeted communication to the at least one user device.

Further, at 320, the method 300 may include storing, using a storage device (such as the storage device 206), the location in association with the network device identifier. At 322, the method 300 may include storing, using the storage device, the interaction data. At 324, the method 300 may include storing, using the storage device, the at least one user data in association with the interaction data. At 326, the method 300 may include storing, using the storage device, the communication policy.

In some embodiments, the method 300 may further include receiving, using the communication device, a time indicator associated with the interaction data. Further, the communication policy may include indication of a communication schedule. Further, the transmitting of the at least one targeted communication may be based on each of the time indicator and the communication schedule.

In some embodiments, the communication policy may include indication of a communication schedule including a time delay indicator and a number of communications indicator. Further, the at least one targeted communication may include a plurality of targeted communications corresponding to a plurality of batches. Further, the method 300 further may include generating, using the processing device, the plurality of batches according to the number of communications indicator. Further, the transmitting of the plurality of targeted communications may include transmitting the plurality of targeted communications in batches. Further, a number of communications in each batch may be based on the number of communications indicator. Further, a time interval between transmitting of a first batch of the plurality of batches and a second batch of the plurality of batches may be based on the time delay indicator.

In some embodiments, the method 300 may further include receiving, using the communication device, a predesigned template from the administrator device. Further, the generating of the at least one targeted communication may be based further on the predesigned template.

Figure 4:
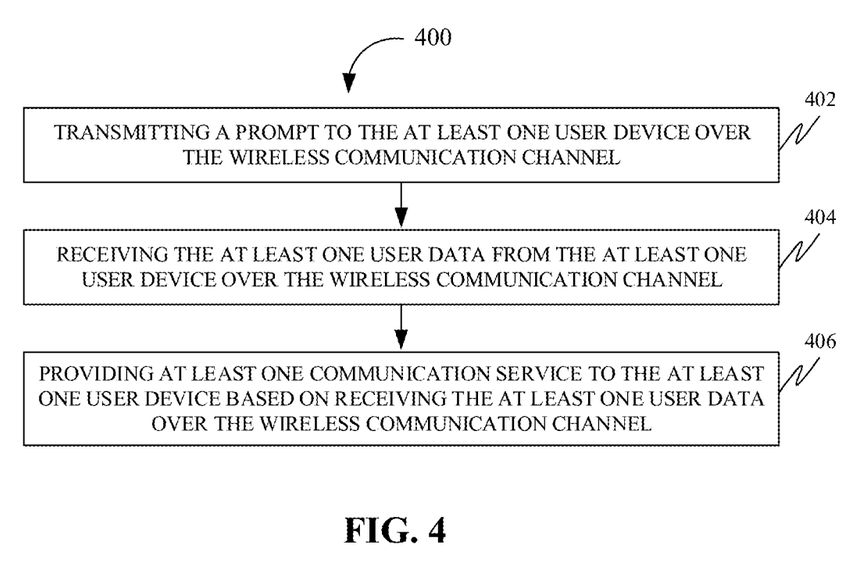
FIG. 4 is a flowchart of a method of granting a communication service to at least one user device, in accordance with some embodiments.

FIG. 4 is a flowchart of a method 400 of granting a communication service to the at least one user device, in accordance with some embodiments. At 402, the method 400 may include transmitting a prompt (from the network device) to the at least one user device over the wireless communication channel. Further, at 404, the method 400 may include receiving the at least one user data (at the network device) from the at least one user device over the wireless communication channel. Further, at 406, the method 400 may include providing at least one communication service (via the network device) to the at least one user device based on receiving the at least one user data over the wireless communication channel. In some embodiments, the at least one communication service may include one or more of internet connectivity and digital content delivery.

According to some embodiments, the disclosed method eliminates the need to use a third party email management system and it also adds automation to send emails based on the end user's Wi-Fi activity at specific physical locations using any standard email server that may be used in a Wi-Fi management platform.

Most if not all managed Wi-Fi platforms utilize RADIUS during the authentication process of Wi-Fi end users. Remote Authentication Dial-In User Service (RADIUS) is a networking protocol that provides centralized Authentication, Authorization, and Accounting (AAA or Triple A) management for users who connect and use a network service. The managed template email system may work with Wi-Fi management systems that utilize RADIUS during their authentication process. Accordingly, the disclosure relates to an email subsystem that allows for administrators to send out and manage email communication to customers who have authenticated on the managed Wi-Fi network at specific physical locations. Accordingly, the present disclosure teaches a template based email system which allows the administrator the ability to send out emails to a group of users who are listed in a campaign. The contents of these email templates may be edited through a "What You See Is What You Get" (WYSIWYG) editor and also provide the administrator with the ability to send personalized emails by replacing certain keywords in the email templates.

The disclosed system may list all the users associated with a Network Access Server Identifier (NAS Id) and show them in a grid. It may allow the administrator to manage the users who are listed to receive critical notices/updates/offers/promotions related emails. It may also allow the NAS Id profile administrator to have 'check box' controls of what users are enrolled in 'offers and updates', critical notices, due invoices etc. Also, the NAS Id profile administrator may have the ability to send messages to enrolled end users on demand or by schedule.

Further, the disclosed system may allow every new end user or account renewal to be automatically enrolled in an 'offers and updates' email campaign. An email may be scheduled for a 'pre-defined delay'. For example, the pre-defined delay may be set to 24 hours after a login session in order to send that end user a message from a customizable template from the NAS Id profile.

Further, any message that is delivered may have a link to allow the user to opt out of these types of messages such as; link to 'remove me from offers and updates'. The end user then may not receive unsolicited messages in the future. This may be added as a generic link at the bottom of email templates.

Further, the NAS Id profile administrator may have the ability to enable or disable the 'offers and updates' messaging sub-system. Further, the NAS Id profile administrator may have the ability to enable/disable the email messaging module.

The disclosed system may also allow for management of schedule based emailing. Therefore, when an email is sent out to a list, its values are input into a scheduling queue and then a daemon script runs every 5 mins and sends a few emails out.

Further, the system may offer reporting logs for all the emails that were scheduled to go out and their outcome. This may allow the administrator to actually view all logs or logs for a specific time period. The system may also allow the administrator to have the ability to download the logs in a CSV format.

Figure 5:
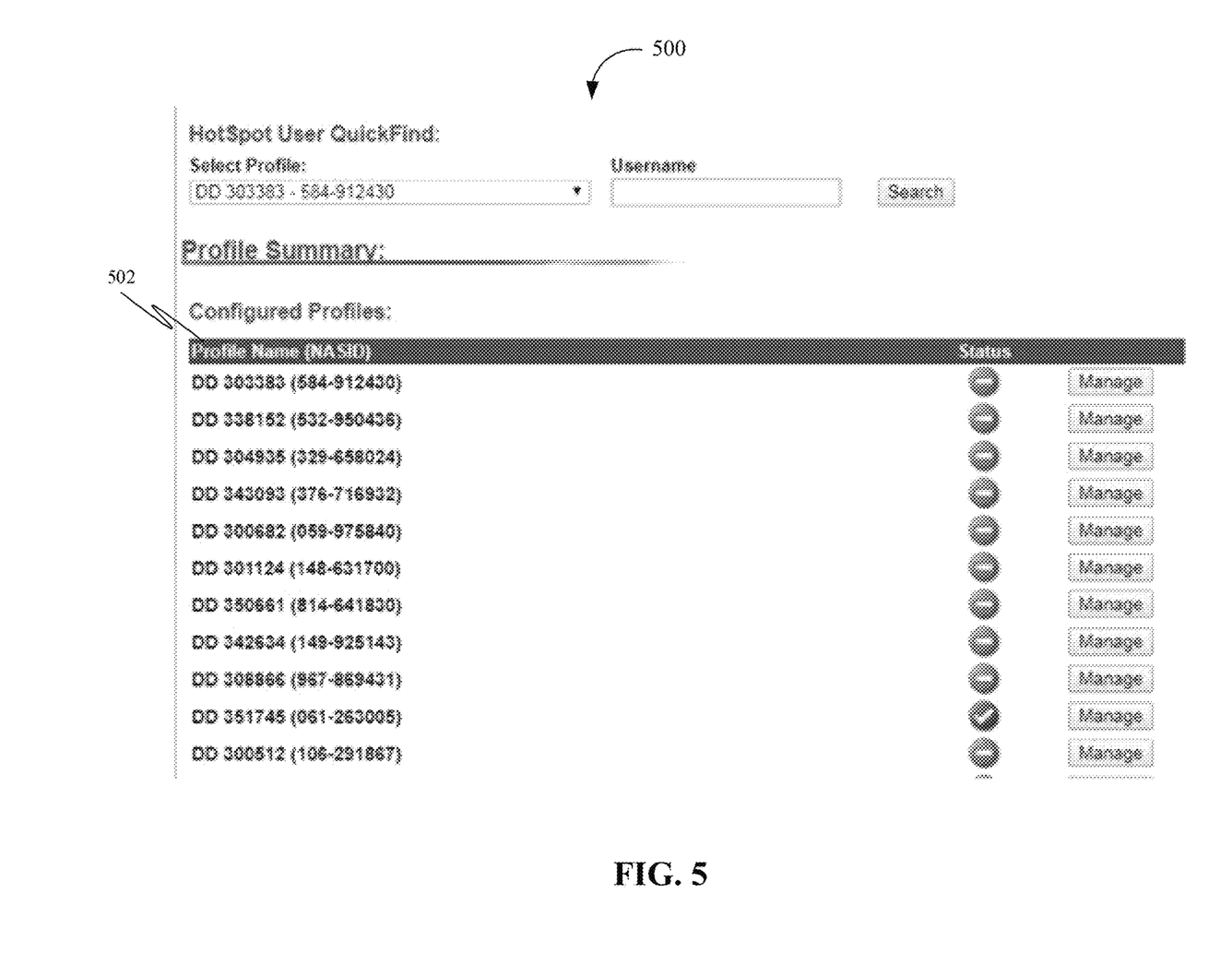
FIG. 5 shows a Graphical User Interface (GUI) of a Wi-Fi management administrator control panel with a typical NAS Id listing, in accordance with an exemplary embodiment.

FIG. 5 shows a Graphical User Interface (GUI) 500 of a Wi-Fi management administrator control panel with a typical NAS Id listing 502, in accordance with an exemplary embodiment. The NAS Id may be primarily used to notify the source of RADIUS access request so that the RADIUS server may choose a policy for that request. When the NAS Id is used in a Wi-Fi management platform it is a unique tag that identifies the profile for a specific physical location. The specific physical location may refer to a place of business, such as a coffee shop on 5th street in Denver Colo., for example. The managed Wireless Access Points at that physical location may be being remotely managed by the GUI 500 and are programmed to connect to their assigned specific NAS Id. When an end user connects to the managed Wireless Access Points at that location they may be presented with a specific authentication portal unique to that NAS Id which may be associated with that NAS Id's profile. That profile may manage the authentication portal which collects information on the end user, such as name, email address, and other optional info such as a mobile phone number if desired. This information may be harvested from the end user who gives the information in exchange for Wi-Fi authentication. The information may be input by the end user in form fields that are housed within the authentication portal. This authentication process may also record specific data such as the date and time of the end user authentication at that physical location. The information from end users from that physical location only may be associated with that specific NAS Id profile and it may be segregated from the data of other NAS Id profiles on that same Wi-Fi management control panel. The managed template email process system interfaces with each individual NAS Id to access its individual end user data and send predesigned templates via email to the end users at scheduled times to those users. These templates may include things such as coupons, discount codes, or other messages that the physical location may like to communicate to the end user from that location.

Further, the disclosed system may work with each NAS Id and the NAS Id helps represent a specific physical location where the managed Wireless Access Points are in operation. The automated template email system may segregate the databases of end user authentication by individual NAS Id. This may help assure that there is no co-mingling of end user data from one physical location to the other so as to be sure that promotions are sent only to users who authenticated at that same location. The automated template email systems may then interact with these database tables based on individual NAS Id.

Figure 6:
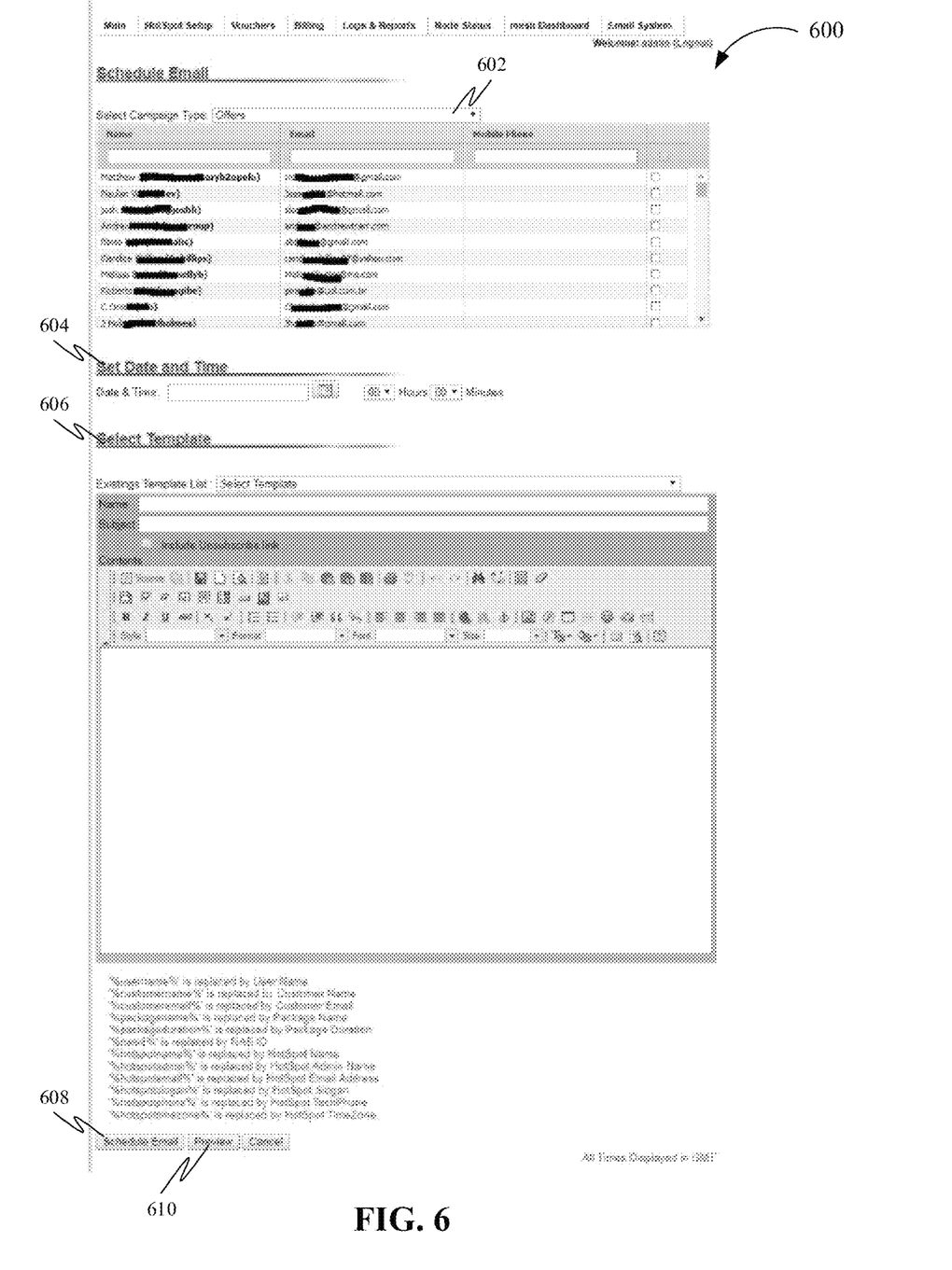
FIG. 6 is a user interface for scheduling email, in accordance with an exemplary embodiment.

FIG. 6 is a user interface 600 for scheduling email in accordance with an exemplary embodiment. The user interface 600 includes a drop-down menu 602 to select a campaign type. The campaign types may be categories named for the sake of keeping track of email templates that go out to groups of end users. An example of a campaign type may be "offers" and then the disclosed system may store the templates that were sent out as "offers" to the end user. The offers templates may include such things as discount offers or coupon codes that may be used as incentives to help get the end users to go back to the physical location sooner than they may have normally gone back without the incentives sent by the template email management system. Other template categories may be such things as "updates" to give the end user updates about the physical location. For example, these may be updates on new hours of operation or information about new menu items. The end user data for that NAS Id may be shown populated in the category section. Further, the disclosed system may provide for the ability to include or exclude users on the list from the email campaign by checking or un-checking the box at the right.

Further, the user interface 600 includes a scheduler module 604 that may allow a user to select the time and date of when the campaign is set to run. Further, the user interface 600 includes a template manager 606 that may provide the ability to pick from the database of existing email templates that are created by the administrator. These templates may include the subject line of the email, the email address of the sender, and the email message in the body of the email and may include text, hyperlinks, images, graphics or file attachments if they are desired. Once the template is chosen, it may load the preset information into the appropriate fields of the module such as subject line and message in the body. These may be customizable using the embedded WYSIWYG editor.

Further, the user interface 600 may include a list of standard wildcard options that may be used in the body of the email to customize the email template for the physical location as well as the individual end user. This helps in automating and eliminating tasks such as adding the same standard information to each email repeatedly such as the name of the physical location, the end user name and email address. Once finished with the customization of the email template, the administrator has the option to send the email at its scheduled time by clicking a schedule button 608 or click a preview button 610 to see what the email may look like or cancel the job. Further, the user interface 600 of the email template scheduler may be interfaced with a FREERADIUS/MySQL database manager which houses the end user data tables which are separated by the individual NAS Ids. The managed template email system may work with Wi-Fi management platforms using RADIUS as part of their authentication process.

The user interface 600 may be designed using Cascading Style Sheets (CSS). The CCS is used as it allows for the management of multiple pages all at once. This allows for the automation of the template email system to be added to each NAS Id as opposed to having to plug the system into each NAS Id as they are created. This also helps keep uniformity of appearance and functionality of the template email system across all NAS Id's on the Wi-Fi management platform.

Further, the template manager 606 allows the administrator to build their templates and store them for later use. The user interface 600 may also have a section to manage the User List of the end user database of emails and names. In some embodiments, the end user database may also contain mobile phone numbers or birthdays. Further, the user interface 600 may allow for the export of the data to a CSV file and allows an administrator to delete users if the administrator chooses to do so.

Further, the scheduler module 604 may interface with the Template Manager databases section and the User List databases. This may allow for the functionality of creating an email campaign and customizing the messages and promotions to be scheduled and sent out via email.

The user interface 600 may also have an email logs section. This may allow the administrator to see data regarding emails that have been sent out in the past. It may allow for the administrator to see the scheduled date and time of the emails that were sent, as well as which template was emailed and to what email addresses they were emailed out to. The administrator may use the user interface 600 to query by specific dates of campaigns by adding in a begin date and end date. This may allow the administrator to query the databases by NAS Id for the emails sent in that time frame using the user interface 600. If the administrator so chooses this section may also allow for the export of this data to a CSV file.

Figure 7:
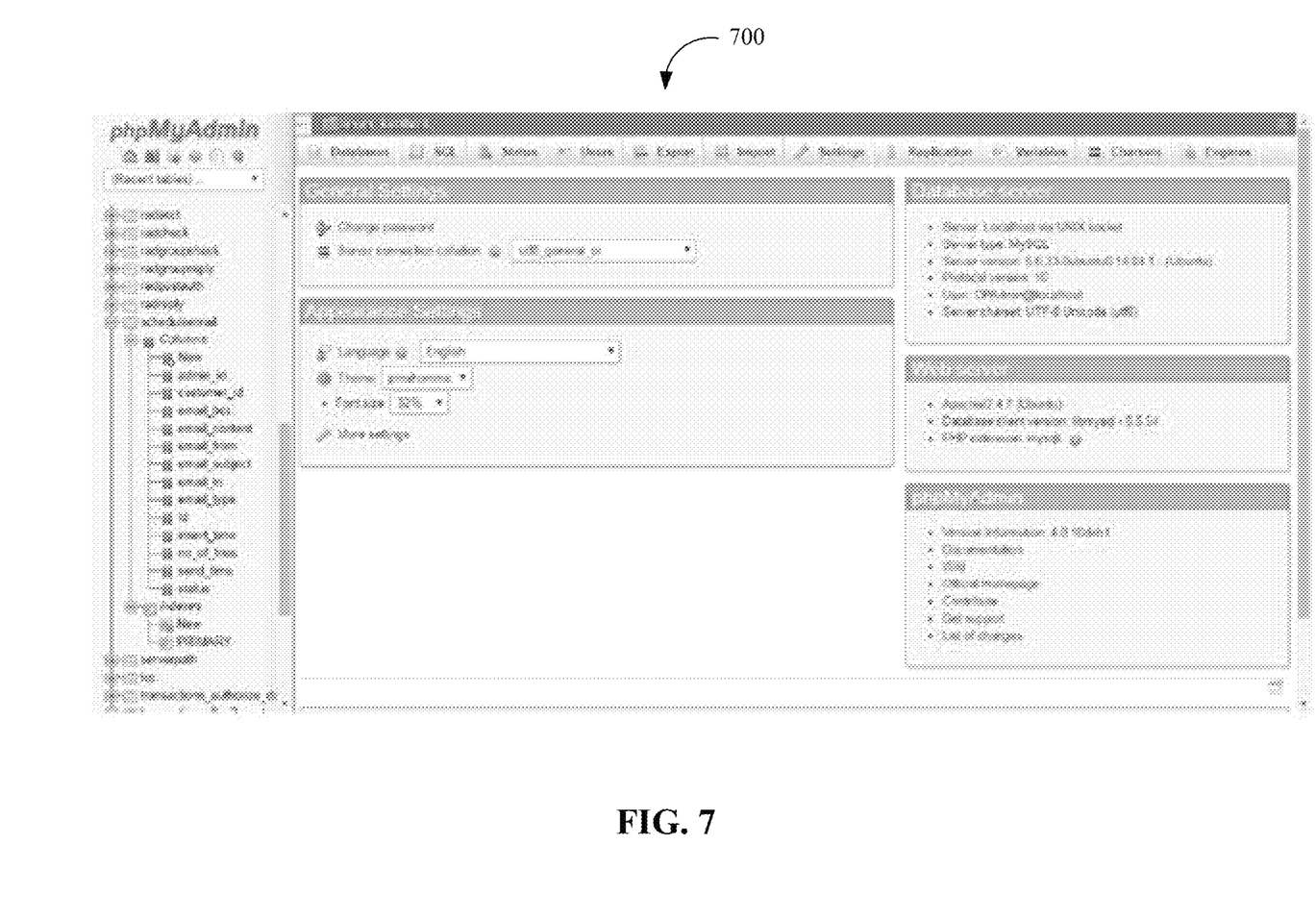
FIG. 7 is a user interface of a phpMyadmin dashboard to help manage MySQL databases, in accordance with an exemplary embodiment.

FIG. 7 is a user interface 700 of a phpMyadmin dashboard which is an open source administrative tool to help manage MySQL databases, in accordance with an exemplary embodiment. MySQl helps manage databases with FREERADIUS tables to help house and separate authentication data of the end users using the Wi-Fi at specific physical locations that are listed by their unique NAS Id. On the left-hand side (in the user interface 700) is a list of database tables that house data from the authentication of end users on the Wi-Fi networks. The database tables needed for the email scheduler to operate have been opened to show the various sub tables of information that are needed for the automated template email scheduler to function. These sub tables separate and segregate the data for the operation of the template email scheduler system functionality when the automated template email system is interfaced with the main database of a Wi-Fi management platform.

The user interface 700 provides the ease of use of the management of MySql which is a tool to communicate with regional databases. The user interface 700 may interface with the RADIUS database. As the template email system may work with Wi-Fi management platforms using RADIUS shows the RADIUS tables that are necessary for the automated template email system functionality. This may allow the disclosed system to schedule and send the emails while the SQL communicates with the data held in the various RADIUS tables. Further, the user interface 700 may allow for the RADIUS and SQL systems to be queried by the administrator through the user interface 700. This eliminates the need for the administrator to manually input queries to retrieve the information stored in the RADIUS tables by entering SQL query scripts through a back end server interface such as a phpMyadmin control panel. In this manner, the user interface 700 adds to the automation and management of the email databases and template databases so that they may all "talk" to each other to send the email campaigns to the targeted end users on the specific NAS Id.

Figure 8:
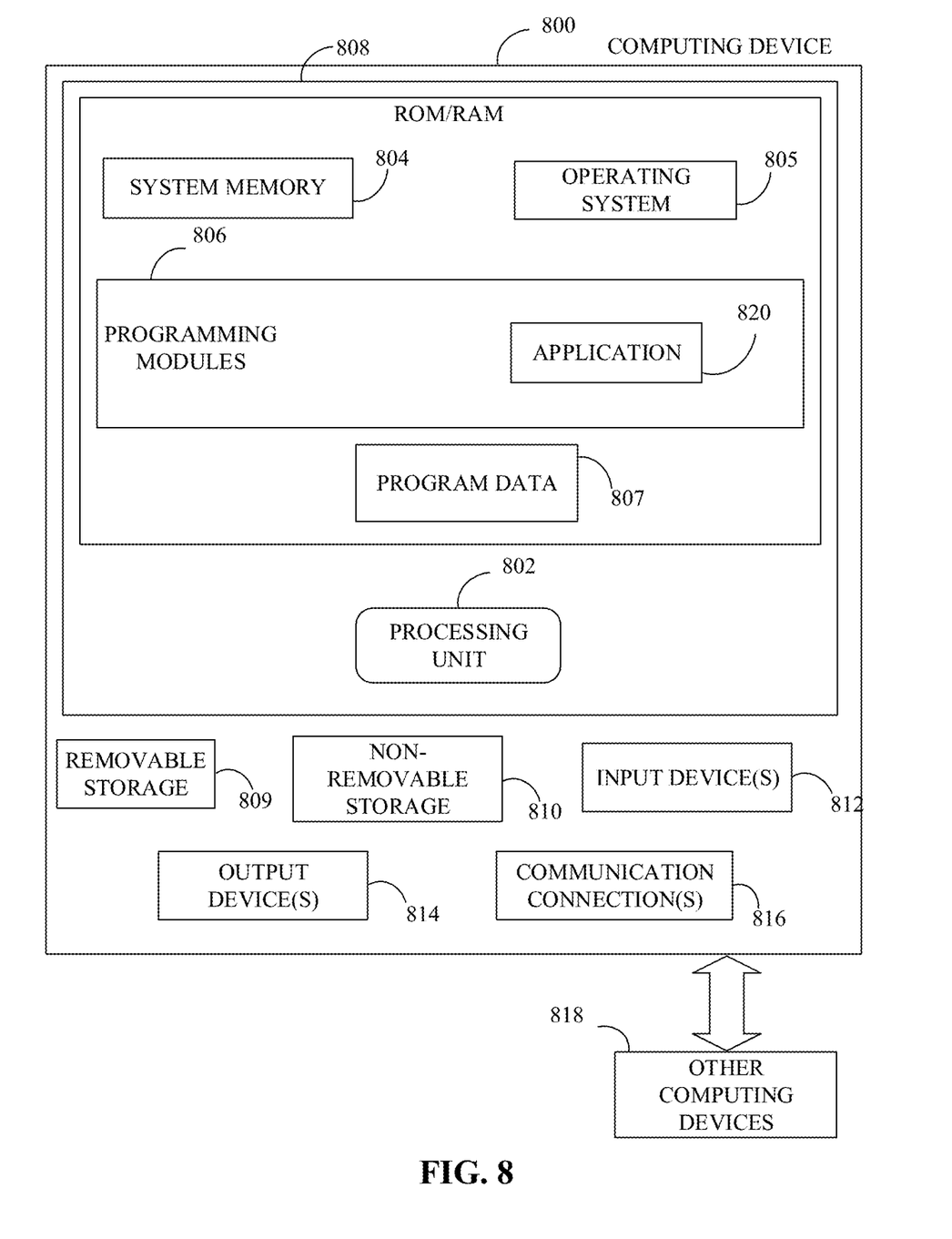
FIG. 8 is a block diagram of a computing device for implementing the methods disclosed herein, in accordance with some embodiments.

With reference to FIG. 8, a system consistent with an embodiment of the disclosure may include a computing device or cloud service, such as computing device 800. In a basic configuration, computing device 800 may include at least one processing unit 802 and a system memory 804. Depending on the configuration and type of computing device, system memory 804 may comprise, but is not limited to, volatile (e.g. random-access memory (RAM)), non-volatile (e.g. read-only memory (ROM)), flash memory, or any combination. System memory 804 may include operating system 805, one or more programming modules 806, and may include a program data 807. Operating system 805, for example, may be suitable for controlling computing device 800's operation. In one embodiment, programming modules 806 may include image-processing module, machine learning module. Furthermore, embodiments of the disclosure may be practiced in conjunction with a graphics library, other operating systems, or any other application program and is not limited to any particular application or system. This basic configuration is illustrated in FIG. 8 by those components within a dashed line 808.

Computing device 800 may have additional features or functionality. For example, computing device 800 may also include additional data storage devices (removable and/or non-removable) such as, for example, magnetic disks, optical disks, or tape. Such additional storage is illustrated in FIG. 8 by a removable storage 809 and a non-removable storage 810. Computer storage media may include volatile and non-volatile, removable and non-removable media implemented in any method or technology for storage of information, such as computer-readable instructions, data structures, program modules, or other data. System memory 804, removable storage 809, and non-removable storage 810 are all computer storage media examples (i.e., memory storage.) Computer storage media may include, but is not limited to, RAM, ROM, electrically erasable read-only memory (EEPROM), flash memory or other memory technology, CD-ROM, digital versatile disks (DVD) or other optical storage, magnetic cassettes, magnetic tape, magnetic disk storage or other magnetic storage devices, or any other medium which can be used to store information and which can be accessed by computing device 800. Any such computer storage media may be part of device 800. Computing device 800 may also have input device(s) 812 such as a keyboard, a mouse, a pen, a sound input device, a touch input device, a location sensor, a camera, a biometric sensor, etc. Output device(s) 814 such as a display, speakers, a printer, etc. may also be included. The aforementioned devices are examples and others may be used.

Computing device 800 may also contain a communication connection 816 that may allow device 800 to communicate with other computing devices 818, such as over a network in a distributed computing environment, for example, an intranet or the Internet. Communication connection 816 is one example of communication media. Communication media may typically be embodied by computer readable instructions, data structures, program modules, or other data in a modulated data signal, such as a carrier wave or other transport mechanism, and includes any information delivery media. The term "modulated data signal" may describe a signal that has one or more characteristics set or changed in such a manner as to encode information in the signal. By way of example, and not limitation, communication media may include wired media such as a wired network or direct-wired connection, and wireless media such as acoustic, radio frequency (RF), infrared, and other wireless media. The term computer readable media as used herein may include both storage media and communication media.

As stated above, a number of program modules and data files may be stored in system memory 804, including operating system 805. While executing on processing unit 802, programming modules 806 (e.g., application 820 such as a media player) may perform processes including, for example, one or more stages of methods, algorithms, systems, applications, servers, databases as described above. The aforementioned process is an example, and processing unit 802 may perform other processes. Other programming modules that may be used in accordance with embodiments of the present disclosure may include machine learning applications.

Generally, consistent with embodiments of the disclosure, program modules may include routines, programs, components, data structures, and other types of structures that may perform particular tasks or that may implement particular abstract data types. Moreover, embodiments of the disclosure may be practiced with other computer system configurations, including hand-held devices, general purpose graphics processor-based systems, multiprocessor systems, microprocessor-based or programmable consumer electronics, application specific integrated circuit-based electronics, minicomputers, mainframe computers, and the like. Embodiments of the disclosure may also be practiced in distributed computing environments where tasks are performed by remote processing devices that are linked through a communications network. In a distributed computing environment, program modules may be located in both local and remote memory storage devices.

Furthermore, embodiments of the disclosure may be practiced in an electrical circuit comprising discrete electronic elements, packaged or integrated electronic chips containing logic gates, a circuit utilizing a microprocessor, or on a single chip containing electronic elements or microprocessors. Embodiments of the disclosure may also be practiced using other technologies capable of performing logical operations such as, for example, AND, OR, and NOT, including but not limited to mechanical, optical, fluidic, and quantum technologies. In addition, embodiments of the disclosure may be practiced within a general-purpose computer or in any other circuits or systems.

Embodiments of the disclosure, for example, may be implemented as a computer process (method), a computing system, or as an article of manufacture, such as a computer program product or computer readable media. The computer program product may be a computer storage media readable by a computer system and encoding a computer program of instructions for executing a computer process. The computer program product may also be a propagated signal on a carrier readable by a computing system and encoding a computer program of instructions for executing a computer process. Accordingly, the present disclosure may be embodied in hardware and/or in software (including firmware, resident software, micro-code, etc.). In other words, embodiments of the present disclosure may take the form of a computer program product on a computer-usable or computer-readable storage medium having computer-usable or computer-readable program code embodied in the medium for use by or in connection with an instruction execution system. A computer-usable or computer-readable medium may be any medium that can contain, store, communicate, propagate, or transport the program for use by or in connection with the instruction execution system, apparatus, or device.

The computer-usable or computer-readable medium may be, for example but not limited to, an electronic, magnetic, optical, electromagnetic, infrared, or semiconductor system, apparatus, device, or propagation medium. More specific computer-readable medium examples (a non-exhaustive list), the computer-readable medium may include the following: an electrical connection having one or more wires, a portable computer diskette, a random-access memory (RAM), a read-only memory (ROM), an erasable programmable read-only memory (EPROM or Flash memory), an optical fiber, and a portable compact disc read-only memory (CD-ROM). Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory.

Embodiments of the present disclosure, for example, are described above with reference to block diagrams and/or operational illustrations of methods, systems, and computer program products according to embodiments of the disclosure. The functions/acts noted in the blocks may occur out of the order as shown in any flowchart. For example, two blocks shown in succession may in fact be executed substantially concurrently or the blocks may sometimes be executed in the reverse order, depending upon the functionality/acts involved.

While certain embodiments of the disclosure have been described, other embodiments may exist. Furthermore, although embodiments of the present disclosure have been described as being associated with data stored in memory and other storage mediums, data can also be stored on or read from other types of computer-readable media, such as secondary storage devices, like hard disks, solid state storage (e.g., USB drive), or a CD-ROM, a carrier wave from the Internet, or other forms of RAM or ROM. Further, the disclosed methods' stages may be modified in any manner, including by reordering stages and/or inserting or deleting stages, without departing from the disclosure.

Although the present disclosure has been explained in relation to its preferred embodiment, it is to be understood that many other possible modifications and variations can be made without departing from the spirit and scope of the disclosure.

The invention claimed is:

1. A system for managing targeted digital marketing communications, the system comprising:
   a communication device;
   a processing device;
   a storage device;
   the communication device being configured for:
      receiving interaction data from a network device associated with a location, wherein the network device is configured for communicating with at least one user device over a wireless communication channel, wherein the interaction data is generated based on the communicating;
      retrieving a unique identifier of the at least one user device over the wireless communication channel;
      receiving a network device identifier from the network device;
      transmitting a graphical user interface to an administrator device, wherein the graphical user interface is configured for presenting at least one user data associated with the at least one user device and receiving a communication policy;
      receiving the communication policy from the administrator device associated with the location, wherein the communication policy is based on the location; and
      transmitting the at least one targeted communication to the at least one user device;
   the processing device being configured for:
      determining a location of the network device based on the network device identifier;
      analyzing the interaction data;
      determining the at least one user data associated with the at least one user device based on the analyzing, wherein the at least one user data comprises at least one contact data; and
      generating at least one targeted communication based on the at least one user data and the communication policy; and
   the storage device being configured for:
      storing the location in association with the network device identifier;
      storing the interaction data;
      storing the at least one user data in association with the interaction data; and
      storing the communication policy;
   wherein the communication channel comprises at least one channel selected from the group consisting of a near-field communication (NFC) channel, a Bluetooth communication channel, a Wi-Fi communication channel, a cellular communication channel and a satellite communication channel;
   wherein the communication device is further configured for receiving a predesigned template from the administrator device;
   wherein the processing device is further configured for generating the at least one targeted communication based further on the predesigned template;
   wherein the processing device is configured for segregating each network device that a specific user device has communicated with at the location thereof;
   wherein the processing device is configured for sending at least one targeted communication for the location of each network device to the specific user device;
   wherein the communication policy comprises indication of a communication schedule comprising a time delay indicator and a number of communications indicator, wherein the at least one targeted communication comprises a plurality of targeted communications corresponding to a plurality of batches, wherein the processing device is further configured for generating the plurality of batches according to the number of communications indicator, wherein the communication device is further configured for transmitting the plurality of targeted communications in batches, wherein a number of communications in each batch is based on the number of communications indicator, wherein a time interval between transmitting of a first batch of the plurality of batches and a second batch of the plurality of batches is based on the time delay indicator.

2. The system of claim 1, wherein the interaction data comprises at least one user device identifier associated with the at least one user device.

3. The system of claim 1, wherein the interaction data comprises the at least one contact data.

4. The system of claim 1, wherein the network device is configured for:
transmitting a prompt to the at least one user device over the wireless communication channel;
receiving the at least one user data from the at least one user device over the wireless communication channel; and
providing at least one communication service to the at least one user device based on receiving the at least one user data over the wireless communication channel.

5. The system of claim 4, wherein the at least one communication service comprises at least one of internet connectivity and digital content delivery.

6. The system of claim 1, wherein the communication policy comprises indication of a communication type corresponding to the at least one targeted communication, a communication medium corresponding to the at least one targeted communication, a communication schedule corresponding to the at least one targeted communication, a user selection criteria corresponding to the at least one targeted communication and a communication content indicator associated with the at least one targeted communication.

7. The system of claim 1, wherein the communication device is further configured for receiving a time indicator associated with the interaction data, wherein the communication policy comprises indication of a communication schedule, wherein the transmitting of the at least one targeted communication is based on each of the time indicator and the communication schedule.

8. A method of targeted digital marketing communications, the method comprising:
receiving, using a communication device, interaction data from a network device associated with a location, wherein the network device is configured for communicating with at least one user device over a wireless communication channel, wherein the interaction data is generated based on the communicating;
retrieving, using the communication device, a unique identifier of the at least one user device over the wireless communication channel;
receiving, using the communication device, a network device identifier from the network device;
transmitting, using the communication device, a graphical user interface to an administrator device, wherein the graphical user interface is configured for presenting at least one user data associated with the at least one user device and receiving a communication policy;
receiving, using the communication device, the communication policy from the administrator device associated with the location, wherein the communication policy is based on the location;
determining, using a processing device, a location of the network device based on the network device identifier;
analyzing, using the processing device, the interaction data;
determining, using the processing device, the at least one user data associated with the at least one user device based on the analyzing, wherein the at least one user data comprises at least one contact data;
generating, using the processing device, at least one targeted communication based on the at least one user data and the communication policy;
transmitting, using the communication device, the at least one targeted communication to the at least one user device;
storing, using a storage device, the location in association with the network device identifier;
storing, using the storage device, the interaction data;
storing, using the storage device, the at least one user data in association with the interaction data; and
storing, using the storage device, the communication policy;
wherein the communication channel comprises at least one channel selected from the group consisting of a near-field communication (NFC) channel, a Bluetooth communication channel, a Wi-Fi communication channel, a cellular communication channel and a satellite communication channel;
wherein the communication device is further configured for receiving a predesigned template from the administrator device;
wherein the processing device is further configured for generating the at least one targeted communication based further on the predesigned template;
wherein the processing device is configured for segregating each network device that a specific user device has communicated with at the location thereof;
wherein the processing device is configured for sending at least one targeted communication for the location of each network device to the specific user device;
wherein the communication policy comprises indication of a communication schedule comprising a time delay indicator and a number of communications indicator, wherein the at least one targeted communication comprises a plurality of targeted communications corresponding to a plurality of batches, wherein the method further comprises generating, using the processing device, the plurality of batches according to the number of communications indicator, wherein the transmitting of the plurality of targeted communications comprises transmitting the plurality of targeted communications in batches, wherein a number of communications in each batch is based on the number of communications indicator, wherein a time interval between transmitting of a first batch of the plurality of batches and a second batch of the plurality of batches is based on the time delay indicator.

9. The method of claim 8, wherein the interaction data comprises at least one user device identifier associated with the at least one user device.

10. The method of claim 8, wherein the interaction data comprises the at least one contact data.

11. The method of claim 8, wherein the network device is configured for:
transmitting a prompt to the at least one user device over the wireless communication channel;
receiving the at least one user data from the at least one user device over the wireless communication channel; and
providing at least one communication service to the at least one user device based on receiving the at least one user data over the wireless communication channel.

12. The method of claim 11, wherein the at least one communication service comprises at least one of internet connectivity and digital content delivery.

13. The method of claim 8, wherein the communication policy comprises indication of a communication type corresponding to the at least one targeted communication, a communication medium corresponding to the at least one targeted communication, a communication schedule corresponding to the at least one targeted communication, a user selection criteria corresponding to the at least one targeted communication and a communication content indicator associated with the at least one targeted communication.

14. The method of claim 8 further comprising receiving, using the communication device, a time indicator associated with the interaction data, wherein the communication policy comprises indication of a communication schedule, wherein the transmitting of the at least one targeted communication is based on each of the time indicator and the communication schedule.

* * * * *